(12) United States Patent
Geyer

(10) Patent No.: US 11,549,575 B2
(45) Date of Patent: Jan. 10, 2023

(54) ROLLER TAPPET FOR A FUEL PUMP

(71) Applicant: Schaeffler Technologies AG & Co. KG, Herzogenaurach (DE)

(72) Inventor: Norbert Geyer, Höchstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/426,182

(22) PCT Filed: Dec. 2, 2019

(86) PCT No.: PCT/DE2019/101028
§ 371 (c)(1),
(2) Date: Jul. 28, 2021

(87) PCT Pub. No.: WO2020/156602
PCT Pub. Date: Aug. 6, 2020

(65) Prior Publication Data
US 2022/0112944 A1     Apr. 14, 2022

(30) Foreign Application Priority Data

Jan. 30, 2019   (DE) ..................... 10 2019 102 289.4

(51) Int. Cl.
*F16H 53/06*     (2006.01)
*F02M 59/44*    (2006.01)
(52) U.S. Cl.
CPC ............. *F16H 53/06* (2013.01); *F02M 59/44* (2013.01)

(58) Field of Classification Search
CPC . F16H 53/06; F02M 59/44; F01L 1/14; F04B 1/0408; F04B 1/0417
See application file for complete search history.

(56) References Cited

U.S. PATENT DOCUMENTS

| 1,802,330 A | 4/1931 | Boland |
| 3,301,241 A | 1/1967 | Iskenderian |
| 3,977,370 A | 8/1976 | Humphreys |

(Continued)

FOREIGN PATENT DOCUMENTS

| AT | 515737 B1 | 6/2018 |
| CN | 1126505 A | 7/1996 |

(Continued)

OTHER PUBLICATIONS

Machine translation of DE 102017220048 A1, Chambonneau et al., May 17, 2018 (Year: 2018).*

*Primary Examiner* — Vinh Luong

(57) ABSTRACT

A roller tappet for a fuel pump includes an integral and hollow-walled guide housing, which has a drive-side edge that encloses a roller mounted on a pin. The ends of the pin are seated in openings in arranged in indented flat surfaces that originate from the drive-side edge and are diametrically opposite each other. An output-side edge of the guide housing has a bridge piece that extends continuously from an inner wall of the one of the flat surfaces to an inner wall of the other flat surface. The bridge piece projects beyond the inner wall towards the outer wall of the particular flat surface, and the output-side outer face of the bridge piece has a contact surface for a pump piston. The flat surfaces are completely continuous from the drive-side edge to the output-side edge of the guide housing.

19 Claims, 2 Drawing Sheets

(56) References Cited

U.S. PATENT DOCUMENTS

| | | | |
|---|---|---|---|
| 4,173,954 A | 11/1979 | Speckhart | |
| 7,603,929 B2 | 10/2009 | Ichikawa et al. | |
| 2013/0104818 A1* | 5/2013 | Dorn | F01L 1/14 |
| | | | 123/90.5 |
| 2016/0160695 A1 | 6/2016 | Hattiangadi et al. | |
| 2017/0342951 A1* | 11/2017 | Xu | F04B 1/0426 |
| 2019/0331207 A1* | 10/2019 | McCarroll | F01L 1/14 |
| 2021/0239200 A1* | 8/2021 | Abrahamson | F01L 1/14 |
| 2022/0010691 A1* | 1/2022 | Geyer | F02M 59/102 |

FOREIGN PATENT DOCUMENTS

| | | | | |
|---|---|---|---|---|
| CN | 102686835 A | | 9/2012 | |
| CN | 103256215 A | | 8/2013 | |
| CN | 106103986 A | | 11/2016 | |
| CN | 105863919 B | | 8/2018 | |
| DE | 10044732 A1 | | 3/2002 | |
| DE | 102008002178 A1 | | 12/2009 | |
| DE | 102012202566 A1 | | 8/2013 | |
| DE | 102012211113 A1 | | 1/2014 | |
| DE | 102012211852 A1 | | 1/2014 | |
| DE | 102012217801 A1 | | 4/2014 | |
| DE | 102013202129 A1 | | 8/2014 | |
| DE | 112013002284 T5 | | 1/2015 | |
| DE | 102016207682 A1 | * | 9/2017 | F16H 53/06 |
| DE | 102016220205 A1 | | 4/2018 | |
| DE | 102017220048 A1 | * | 5/2018 | F16H 53/06 |
| DE | 102017107099 B3 | | 6/2018 | |
| DE | 102017107100 B3 | | 6/2018 | |
| DE | 202018105429 U1 | | 10/2018 | |
| EP | 3054116 A1 | | 8/2016 | |
| EP | 2406494 B1 | | 1/2018 | |

* cited by examiner

ROLLER TAPPET FOR A FUEL PUMP

CROSS-REFERENCE TO RELATED APPLICATIONS

This application is the U.S. National Phase of PCT Application No. PCT/DE2019/101028 filed on Dec. 2, 2019, which claims priority to DE 10 2019 102 289.4 filed on Jan. 30, 2019, the entire disclosures of which are incorporated by reference herein.

TECHNICAL FIELD

This disclosure relates to a roller tappet for a fuel pump.

BACKGROUND

A generic roller tappet, of extruded or deep-drawn type, can be found in EP 2 406 494 B1. It is found that this roller tappet is too complicated to build, has too many components and, in total, causes excessively high costs in mass production. In addition, it is not suitable for pump drives with long installation lengths. The above-mentioned extrusion or deep drawing reaches production-technical limits here.

Brief Discussion of Other Publications

DE10 2013 202 129 A1 and DE10 2012 211 852 A1 each show an essentially cylindrical roller tappet, the bridge piece of which also acts as a rotation lock. DE10 2012 211 113 A1 discloses a cylindrical roller tappet, the bridge piece of which is fixed in the housing via a separate spring ring. From DE10 2012 217 801 A1, a cylindrical roller tappet is known, the bridge piece of which is joined with a separate nose as a rotation lock. A roller tappet with a solid housing, here not for a pump drive but for a push rod valve drive of an internal combustion engine, is described in U.S. Pat. No. 3,977,370 A. U.S. Pat. No. 3,301,241 A likewise shows a roller tappet for a push rod valve drive of an internal combustion engine. Its housing, in turn, is solid and a separate contact plate for the push rod is built into the inside wall. US 2016/0 160 695 A1 also discloses a roller tappet for a push rod valve drive of an internal combustion engine, which in turn has a solid housing and is provided with a hook on the head side as a rotation lock. U.S. Pat. No. 1,802,330 A likewise describes a roller tappet for a push rod valve drive of an internal combustion engine, having an elongated, cylindrical housing with a separate push rod system. U.S. Pat. No. 4,173,954 A discloses a rotation lock for two valve train tappets with the same effect, consisting of a plate connecting them. DE 100 44 732 A1 describes a roller tappet, the housing of which is created from a plate with four sheet metal strips bent open. Finally, reference is made to DE 10 2017 107 099 B3 and DE 10 2017 107 100 B3. They disclose 'long-construction' roller tappets for pump drives with a multi-part and therefore complex housing structure.

SUMMARY

The object is to create a pump tappet as mentioned above, which is particularly suitable for long installation distances and which is particularly simple in design and inexpensive to manufacture.

According to the disclosure, this object is achieved in that the flat surfaces extend completely through from the drive-side to the output-side edge of the guide housing, wherein the bridge piece is a separate rod seated in complementary receptacles of the flat surface with its end regions, which receptacles are present as openings through the wall of the flat surfaces, wherein the contact surface of the rod for the pump piston is formed by a longitudinal flattening and wherein the drive-side edge and the output-side edge of the guide housing are plane elevation-free.

Thus, there is an extremely simplified roller tappet for a fuel pump, reduced to its essential functions, which can be produced extremely inexpensively in large series. The continuous flat surface stiffens the entire structure, especially since the ends of the pin and the now rod-shaped bridge piece can extend slightly therein without intersecting with a "guide track" of the roller tappet. In abstract terms, the flat surfaces can also be viewed as diametrically opposed "impressions" of an original piece of pipe.

It is true that the guide housing can have a length which roughly corresponds to that of its diameter. However, the guide housing can have a length which is at least approximately 1.5 times its diameter. In this way, with a simple and narrow structure, large installation clearances, as can be seen in pump drives on internal combustion engines, the cams or eccentrics of which are applied to a valve train camshaft, can be bridged.

According to an embodiment of the disclosure, the guide housing can, for example, be separated from a simple semi-finished product, such as an extruded profile. Sawing or chopping, for example, is expedient here. The extruded profile can have the desired cross-sectional profile of the guide housing. Alternatively, for comparatively low installation heights, deep drawing or extrusion could also be considered.

The rod, joined as a bridge piece with the receptacles on the output side of the guide housing, can have a polygonal, ring, or circular profile in cross section. The receptacles in the guide housing for this purpose can be complementary thereto, wherein, in the case of the polygonal profile, a rotation lock, if desired, is unnecessary.

It is provided that the rod-shaped bridge piece is non-rotatably arranged in the receptacles of the flat surface. Here caulking, pressing in, welding or similar are considered.

Depending on the design of the cross section of the guide housing, it may be possible to dispense with a rotation lock therefor. It is also conceivable and provided to design a guide track of a surrounding structure for the roller tappet so that it is completely complementary to its contour. Likewise, the pin or rod could be extended axially on one end side to such an extent that it engages in a corresponding longitudinal groove in the guide track.

The guide housing can be designed in such a way that it is mirror-symmetrical on both sides of its transverse center plane. This simplifies its manufacture, but also an assembly of the axle and the rod.

In concrete terms, it is proposed to make the flat surfaces stronger than the remaining wall thickness of the guide housing. This measure stiffens the construction and ensures that the pin/rod rest in the openings/receptacles of the guide housing.

A special measure towards lightweight construction is also disclosed. Accordingly, it is provided that circumferential sections of the roller tappet lying outside the flat surface are cut out or partially cut out. For example, mere window-like openings of small height are conceivable and provided to minimize weight.

Measures for a simple lateral guidance of the roller are also proposed. Accordingly, it should start immediately in front of the inner walls of the flat surface. Separate axial locks can therefore be dispensed with.

An alternative use of the roller tappet can be seen in valve drives of internal combustion engines or generally in pump or compressor drives.

BRIEF DESCRIPTION OF THE DRAWINGS

The disclosure is evident from the drawing. In the figures.

DETAILED DESCRIPTION

Figure 1:
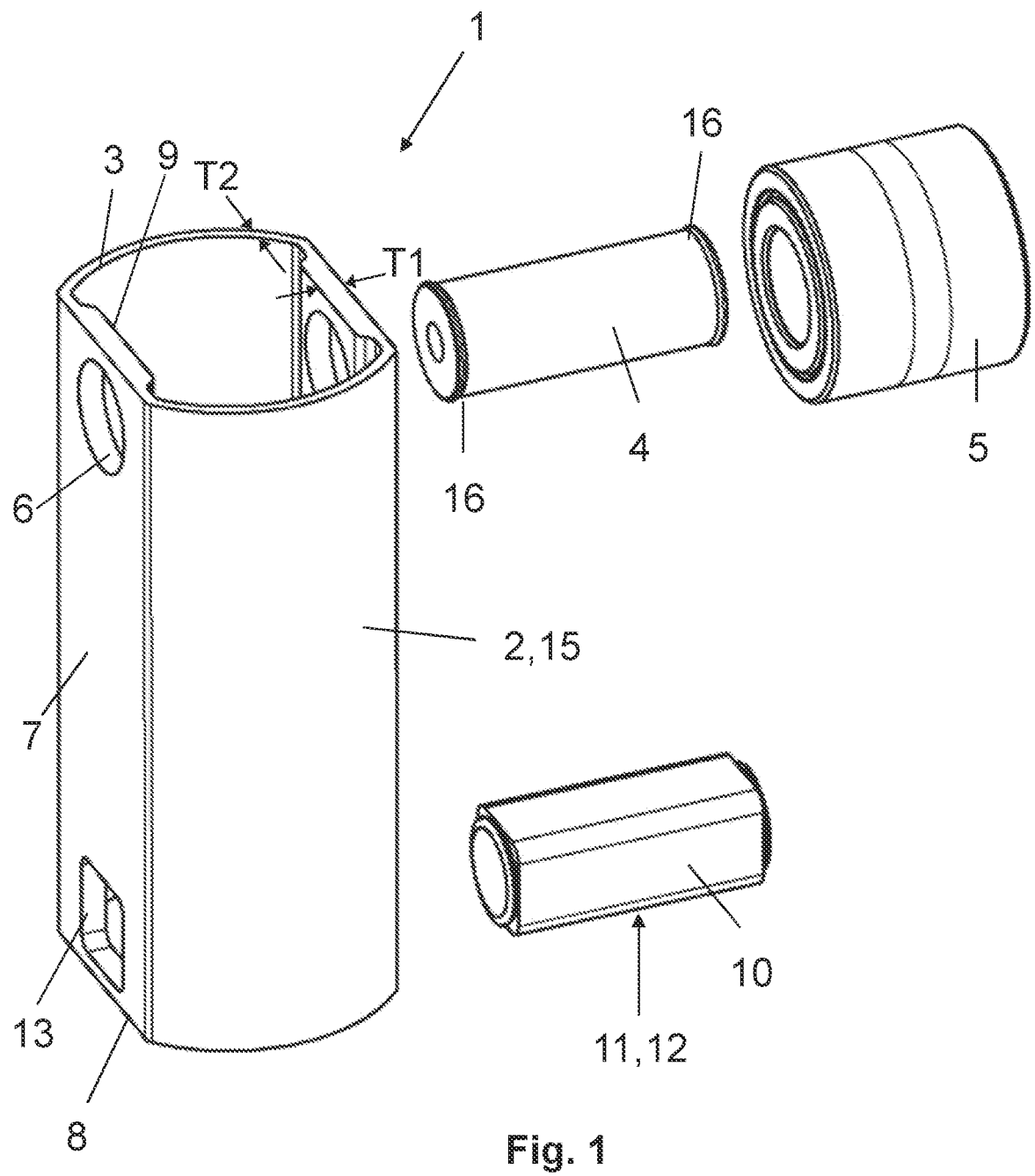
FIG. 1 shows the roller tappet in an exploded view.
Figure 2:
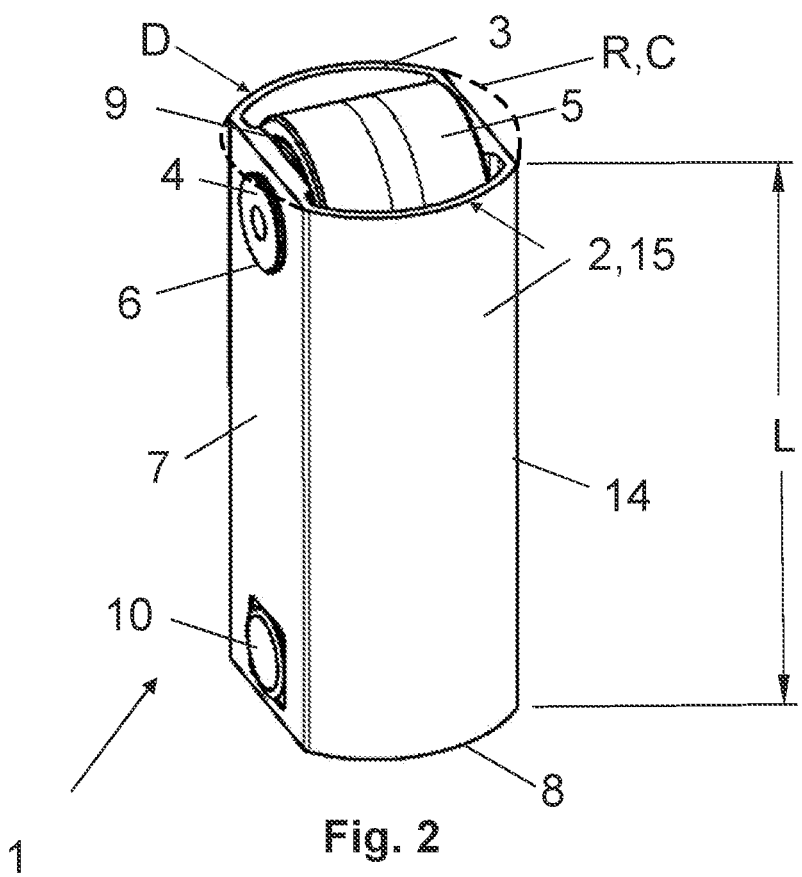
FIG. 2 shows the roller tappet according to FIG. 1 in a three-dimensional view.

A roller tappet 1 for a fuel pump is shown in FIGS. 1, 2. It has a one-piece, thin-walled and 'elongated' guide housing 2. 'Elongated' here means that the roller tappet 1, more precisely its guide housing 2, has a length L that is at least 1.5 times a diameter D of its cylindrical circumferential sections 15. Optionally, a ratio greater than approximately 1.2 is also considered.

A roller 5 mounted on a pin 4 is framed by a drive-side edge 3 of the guide housing 2, which slightly protrudes beyond the drive-side edge 3 and is guided on inner walls 9 by flat surfaces 7 discussed below. In the case of an output-side edge 8 of the guide housing 2, a rod 10 with a polygonal profile extending from its inner wall 9 to the inner wall 9 is applied. On its output side outer face 11, it has a flattened contact surface 12 for a follower element (pump piston).

It can be seen that the guide housing 2 has two diametrically opposite, axially continuous flat surfaces 7 that have a wall thickness T1 greater than a wall thickness T2 of the cylindrical circumferential sections 15. Here, on the one hand, there are openings 6 on the drive side, in which the pin 4 carrying the roller 5 is seated. On the other hand, there are output-side receptacles 13 with a polygonal profile, in which the rod 10 extends in a torsion-proof manner in solid material. Edges 3, 8 of the guide housing 2 are completely flat, which simplifies the construction and, among other things, also facilitates assembly of the guide housing with its other components and transport in pallets or the like.

It can be seen from FIG. 2 that the pin 4 and the rod 10 slightly protrude axially beyond the flat surface 7. In this case, however, they do not intersect an imaginary circular arc A of a circle C (defined by the cylindrical circumferential sections 15) of the guide housing 2 in the cross section at the flat surfaces 7. In this solution, the pin 4 and rod 10 are caulked in the flat surface 7 at the end.

Figure 3:
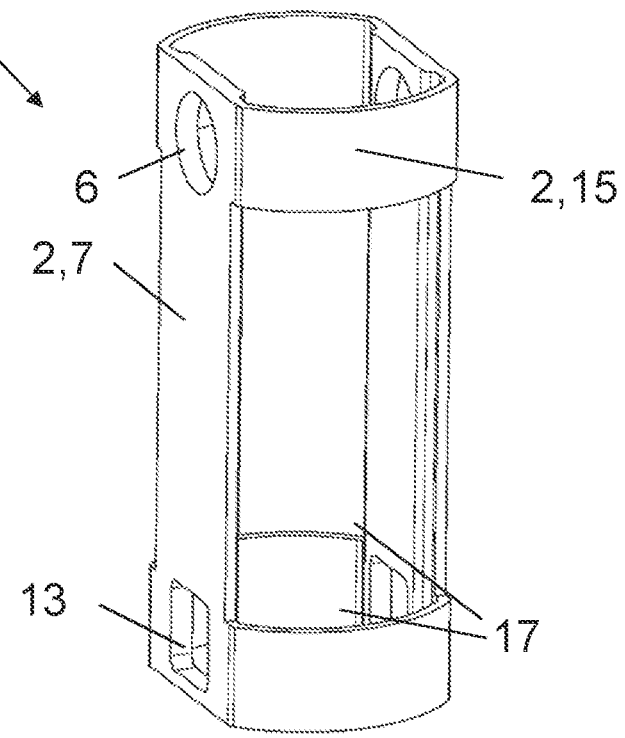
FIG. 3 shows a guide housing of the roller tappet in an alternative lightweight solution.

FIG. 3 shows a guide housing 2 in a modified variant. In this case, the cylindrical circumferential sections 15 of the guide housing 2 include axially extending cut-outs 17 outside the openings 6 and receptacles 13.

LIST OF REFERENCE SYMBOLS

1 Roller tappet
2 Guide housing
3 Drive-side edge
4 Pin
5 Roller
6 Opening
7 Flat surface
8 Output-side edge
9 Inner wall
10 Bridge piece, rod
11 Outer face, bridge piece
12 Contact surface
13 Receptacle
14 Longitudinal edge
15 Circumferential section
16 End pin
17 Cut-out
D Diameter of circle
R Arc of circle
T1 Wall thickness of flat surface
T2 Wall thickness of circumferential section

The invention claimed is:

1. A roller tappet for a fuel pump, the roller tappet comprising:
an integral and hollow-walled guide housing having:
a drive-side edge enclosing a roller mounted on a pin, a first end of the pin seated in a first opening arranged in a first indented flat surface of the hollow-walled guide housing, and a second end of the pin seated in a second opening arranged in a second indented flat surface of the guide housing, the first and second indented flat surfaces originating from the drive-side edge of the guide housing and arranged diametrically opposite each other,
a bridge arranged at an output-side end of the guide housing, the bridge extending continuously from a first inner wall of the first indented flat surface to a second inner wall of the second indented flat surface, an output-side outer face of the bridge having a contact surface configured for a pump piston, and the first and second indented flat surfaces extending continuously from the drive-side edge to an output-side edge of the guide housing, and
the bridge has a first end region seated in a first receptacle of the first indented flat surface, and a second end region seated in a second receptacle of the second indented flat surface, and
the first and second receptacles pass through each wall of the first and second indented flat surfaces, and
the contact surface of the bridge is formed by a longitudinal flattened portion.

2. The roller tappet of claim 1, wherein the hollow-walled guide housing has a length which corresponds to at least 1.5 times its diameter in a circumferential section outside of the first and second indented flat surfaces.

3. The roller tappet according of claim 1, wherein the bridge has a polygonal profile.

4. The roller tappet of claim 1, wherein the bridge is one of either a tubular or solid cylindrical piece on which the longitudinal flattened portion is arranged as the contact surface.

5. The roller tappet of claim 1, wherein a cross-section of cylindrical circumferential sections of the hollow-walled guide housing define a circle, and at least one of the pin or the bridge protrudes axially beyond the first and second indented flat surfaces without intersecting the circle.

6. The roller tappet of claim 1, wherein the bridge is non-rotatably attached to the hollow-walled guide housing.

7. The roller tappet according of claim 1, wherein the first and second indented flat surfaces each have a greater wall thickness than remaining cylindrical circumferential sections of the hollow-walled guide housing.

8. The roller tappet of claim 1, wherein cylindrical circumferential sections of the hollow-walled guide housing are cut out axially.

9. The roller tappet of claim 1, wherein the roller is guided by the first and second inner walls.

10. The roller tappet of claim 1, wherein the hollow-walled guide housing is formed via deep drawing.

11. The roller tappet of claim 1, wherein the bridge projects beyond the first and second inner walls.

12. A roller tappet comprising:
a hollow-walled guide housing of one-piece construction, the hollow-walled guide housing having:
a drive-side edge,
an output-side edge,
a first indented flat extending continuously in an axial direction from the drive-side edge to the output-side edge, the first indented flat having a first opening and a first receptacle,
a second indented flat extending continuously in the axial direction from the drive-side edge to the output-side edge, the second indented flat: i) having a second opening and a second receptacle, and ii) arranged diametrically opposite to the first indented flat, and
a roller arranged protruded relative to the drive-side edge, the roller supported by a pin disposed within first and second openings, and
a bridge having a first end disposed within the first receptacle and a second end disposed within the second receptacle, the first and second receptacles extending through each wall of the first and second indented flats, and
the bridge formed with a flat surface configured to receive a follower element.

13. The roller tappet of claim 12, wherein the hollow-walled guide housing further comprises a first cylindrical circumferential section and a second cylindrical circumferential section, the second cylindrical circumferential section arranged diametrically opposite to the first cylindrical circumferential section.

14. The roller tappet of claim 13, wherein:
the first cylindrical circumferential section comprises a first axially extending cut-out, and
the second cylindrical circumferential section comprises a second axially extending cut-out.

15. The roller tappet of claim 13, wherein the first indented flat defines a first wall thickness, and the first cylindrical circumferential section defines a second wall thickness less than the first wall thickness.

16. The roller tappet of claim 15, wherein the bridge and the roller are separated by a hollow space that continuously extends in the axial direction from the roller to the bridge.

17. The roller tappet of claim 12, wherein the bridge has a polygonal profile.

18. A roller tappet comprising:
a hollow-walled guide housing of one-piece construction, the hollow-walled guide housing having:
a drive-side edge,
an output-side edge,
a first indented flat extending continuously in an axial direction from the drive-side edge to the output-side edge, the first indented flat having a first opening and a first receptacle,
a second indented flat extending continuously in the axial direction from the drive-side edge to the output-side edge, the second indented flat: i) having a second opening and a second receptacle, and ii) arranged diametrically opposite to the first indented flat,
a roller arranged protruded relative to the drive-side edge, the roller supported by a pin disposed within first and second openings, and
a bridge having a first end disposed within the first receptacle and a second end disposed within the second receptacle, the first and second ends extending through each wall of the first and second indented flats, and
the bridge configured to receive a follower element.

19. The roller tappet of claim 18, wherein the hollow-walled guide housing further comprises:
a first cylindrical circumferential section adjoined with the first indented flat, and
a second cylindrical circumferential section adjoined with the second indented flat.

* * * * *